Jan. 17, 1967  R. J. INGHAM  3,298,557
INSTRUMENT CASING
Filed July 18, 1963

INVENTOR.
ROBERT J. INGHAM
BY M W Goodwin
ATTORNEY

United States Patent Office 3,298,557
Patented Jan. 17, 1967

3,298,557
INSTRUMENT CASING
Robert J. Ingham, Fairfield, Conn., assignor, by mesne assignments, to Dresser Industries, Inc., Dallas, Tex., a corporation of Delaware
Filed July 18, 1963, Ser. No. 296,024
1 Claim. (Cl. 220—44)

This invention relates primarily to instrument casings and more particularly to a novel and improved means for venting of a casing in the event that an excessive pressure develops internally of the casing.

The invention finds particular utility in connection with pressure gauges and while the invention will be described most particularly in terms of its utilization in such an instrument, it will be understood that the invention is not so limited in its application and that it is adapted to other applications which will be apparent to those skilled in the art.

Pressure gauges of the type with which this invention is concerned may conventionally comprise a generally cylindrical casing open at one end and housing a pressure responsive element such as a Bourdon tube. The Bourdon tube is adapted to be connected to a source of pressure externally of the gauge and has a free end which moves in response to changes in the pressure being sensed. The free end of the Bourdon tube may be connected by suitable means, such as gear segment and linkage arrangement well known in the art, to a pointer shaft which mounts a pointer which moves over a dial supported on the gauge casing. The pointer shaft and dial are normally disposed concentrically of and in registry with the open end of the casing, and a transparent cover, or crystal, is mounted over the dial to close the open end of the casing and at the same time permit viewing of the pointer position relative to the dial. A mounting ring or bezel is often used to retain the crystal on the casing. In such gauges it is usually desirable that the casing be sealed against inadvertent entrance of water or other fluids which would interfere with operation of the gauge or could cause deterioration of the operative elements within the casing.

In such a gauge, if a leak should occur in the Bourdon tube within the casing, there will be an increase in fluid pressure within the gauge casing which may, if it is sufficiently excessive, cause rupture of the casing. For this reason, there have been various developments to provide casings which will permit automatic venting of the interior thereof in the event of excessive pressure within the casing. Such developments have for the most part involved substantial changes in design of the more conventional gauges and have involved the use of additional elements thereby increasing the complexity and cost of the resulting gauge.

It is the purpose of the present invention to provide novel and improved means for closing an opening in a generally sealed casing which will permit automatic venting of the casing in response to an excessive pressure within the casing. It is another object of this invention to provide novel and improved means for providing automatic venting of the casing of a pressure responsive instrument in response to excessive fluid pressure within the casing and in a manner which does not involve the utilization of additional expensive elements and which in effect utilizes only the usual elements of such an instrument.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claim.

The objects of the present invention are achieved in a specific embodiment thereof which utilizes the crystal or transparent cover for the open end of a pressure gauge as the pressure relieving element for the casing. More specifically, the cover is fabricated of a transparent, flexible material, such as one of those commonly known as a plastic. The crystal is supported on the open end of the gauge casing in more or less conventional manner, and a bezel or ring is utilized to retain the crystal on the casing. As is conventional, the bezel is provided with a portion overlying the crystal and contacting the same to maintain the crystal in contact with the casing entirely about the axis of the open end of the casing to thereby close and seal the casing. However, in accordance with the present invention, the overlying portion of the bezel overlying the crystal is provided with at least one raised portion spaced out of contact with the crystal which will permit the underlying portion of the crystal to flex outwardly of the casing in response to an excessive pressure within the casing and thereby vent the interior of the casing and prevent rupture. The above described aspect of the invention, as well as others, will be more clearly apparent from the following detailed description when taken in connection with the accompanying drawings in which:

Figure 1:
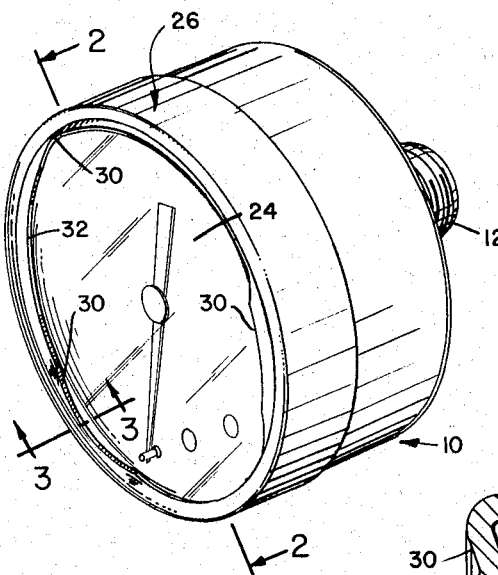
FIG. 1 is an isometric view of a pressure responsive instrument incorporating the present invention.
Figure 2:
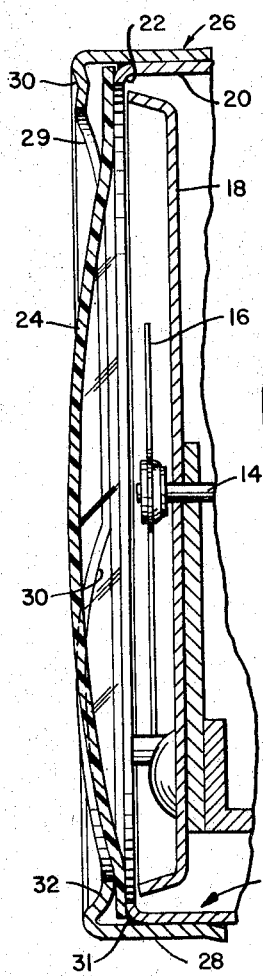
FIG. 2 is an enlarged cross-sectional view substantially along the lines of 2—2 of FIG. 1.

With reference to the drawings, the invention is shown in application to a pressure responsive instrument and more particularly a pressure gauge. As noted above, while the invention will be described in detail in connection with a pressure gauge, it will be understood that the invention is not limited to such use. The gauge shown in the drawing comprises a generally cylindrical casing 10 which is closed at one end (not shown). Extending outwardly of the closed end of the casing is a socket or fitting 12 adapted to be connected to a conduit leading to a pressure source the pressure of which it is desired to measure. The socket 12 is connected to pressure responsive means such as a Bourdon tube (not shown) within the casing which in turn is suitably drivingly connected to a pointer shaft 14. As shown in FIG. 2, the pointer shaft mounts a pointer 16 for movement therewith in response to changes in the pressure being sensed. The pointer cooperates with a dial member 18 which is suitably supported in fixed relation to the casing 10 and in underlying relationship with the pointer 16. The dial 18 is generally circular in shape and disposed concentrically of and within the gauge casing adjacent to the end thereof opposite the fitting 12. This end of the casing is open to permit viewing of the dial 18 and pointer 16 from externally of the casing. The cylindrical side wall 20 of the casing 10 terminates at the open end of the casing in an inturned lip 22 extending entirely about the axis of the casing to provide a continuous annular surface facing generally outwardly of the open end of the casing.

In order to close the open end of the casing while at the same time permit viewing of the dial and pointer, a transparent cover 24 of generally circular configuration is arranged concentrically of the open end of the casing. The outer peripheral portion of the cover 24 rests upon the outwardly facing annular surface formed by the lip 22 of the casing in order to provide a seal for the open end of the casing. The crystal 24 is retained on the casing by a mounting ring or bezel generally indicated at 26. The mounting ring comprises a generally cylindrical portion 28 which is engaged in an overlying telescoping relationship with the cylindrical wall 20 of the casing 10 adjacent the open end of the casing. The cylindrical portion 28 of the mounting ring preferably fits over the side wall of the casing sufficiently closely to provide an essentially watertight seal at this point. The cylindrical wall 28 of the retaining ring extends outwardly beyond the open end of the casing and terminates in a generally annular portion directed radially inwardly of the casing to provide a generally annular member 29 overlying the crystal 24. The annular portion 29 of the mounting ring contacts the crystal in overlying relation to hold the same in contact with the lip 22 on the gauge casing entirely about the axis of the casing to provide a seal at this point. In order to enhance the casing seal, a quantity of sealing compound 31 is provided about the lip 22 of the casing between the crystal and the lip 22.

Figure 3:
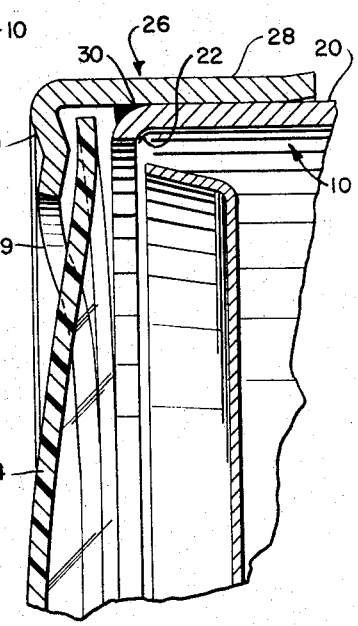
FIG. 3 is an enlarged fragmentary cross-sectional view substantially along the lines of 3—3 of FIG. 1.

In accordance with prior practice, the annular portion 28 of the bezel would normally contact the crystal entirely about the axis of the casing. However, in accordance with the present invention, the annular portion 29 is provided with at least one raised portion 30 which is spaced out of contact with the crystal. In the specific embodiment shown, the annular portion 29 of the bezel is provided with three such portions spaced equiangularly about the axis of the casing and separated by clamping portions 32 which hold the crystal in contact with the lip 22 on the casing. The raised portions 30 have an underlying surface which overlies the crystal and which as shown in FIGS. 2 and 3 is spaced from the outwardly facing surface of the crystal sufficiently to permit outward flexing of the crystal. As shown in FIG. 3, in response to an excessive pressure within the casing, this outward flexing of the crystal will permit venting of the interior of the casing and in this connection, as will be seen in FIGS. 2 and 3, the peripheral edge of the crystal is spaced from the inner surface of the cylindrical portion wall 28 of the bezel.

The pressure within the casing at which point the crystal will be flexed to provide venting of the casing will, of course, be determined by several factors, including the degree of resiliency of the crystal, the length of each raised portion or portions 30 of the bezel for a given diameter crystal, as well as the thickness of the crystal. By way of example, a specific embodiment incorporating the present invention involved a gauge casing having an outer diameter of about 1.598" at its open end and provided with a cellulose acetate butyrate crystal having a diameter of about 1.593" and a thickness of approximately .040". The crystal was provided with a generally central crowned portion with a generally planar annular outer peripheral portion. The raised portions 30 of the bezel each extended about 60° around the axis of the casing and were equally spaced. The raised portions 30 were spaced outwardly from the planar peripheral portion of the crystal approximately .020" at a maximum. The inner diameter of the bezel was about 1.5955" with a wall thickness of about .020" in brass so that it is force fit onto the casing. Internal pressure relief was provided with such a construction when the internal pressure of the casing exceeded approximately 10 p.s.i.g. with the exterior of the casing exposed to atmosphere.

Thus it can be seen there has been novel and improved means for closing and opening in a casing where the casing is susceptible to being exposed internally to fluid pressures in excess of the pressure externally of the casing and which will provide venting of the casing in the event that the internal fluid pressure of the casing becomes excessive. In the application of the invention to a pressure responsive instrument such as a gauge, the invention achieves its objects without the use of any additional elements over and above those conventionally used in such instrument, thus providing improved safety of operation and at the same time maintaining simplicity and economy of production.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claim is intended to cover all of the generic and specific features of the invention herein described and all statements of the scope of the invention which, as a matter of language, might be said to fall therebetween.

Having described my invention, I claim:

A dial instrument comprising a cylindrical casing open at one end, said one end of the casing being provided with an inwardly turned annular surface facing generally outwardly of the said opening, a transparent cover generally circular in shape resting on said annular surface and closing said opening in the casing, a bezel mounted on said one end of the casing and comprising a generally cylindrical portion in closely fitting telescopic relation over said one end of the casing, said cylindrical portion of said bezel extending outwardly beyond said one end of the casing and spaced from the periphery of said transparent cover, the bezel further including a generally annular portion terminating said cylindrical portion of said bezel and extending radially inwardly of the casing in overlying relationship to and contacting said transparent cover normally to hold the same in contact with said annular surface, said annular portion of the bezel being provided with at least one raised portion spaced out of contact with said transparent cover to permit flexing of the underlying portion of the cover out of contact with said annular surface on said one end of the casing to provide venting of the casing in response to excessive fluid pressure within the casing.

References Cited by the Examiner

UNITED STATES PATENTS

| | | | |
|---|---|---|---|
| 2,514,124 | 7/1950 | Eisen. | |
| 2,693,896 | 11/1954 | Brown | 220—44 |
| 2,829,796 | 4/1958 | Dieny | 220—44 |
| 3,114,467 | 12/1963 | Montgomery | 220—44 |

LOUIS G. MANCENE, *Primary Examiner.*

GEORGE E. LOWRANCE, THERON E. CONDON,
*Examiners.*